United States Patent [19]
Cioccio et al.

[11] 3,803,543
[45] Apr. 9, 1974

[54] REMOTELY FORMED MULTIBEAM HYDROPHONE SYSTEM

[75] Inventors: Armand Cioccio, Wheaton; Edward C. Whitman, Silver Spring; Cottrell, Jr. James E., Wheaton; Jim B. McQuitty, Adelphi, all of Md.; John D. Sherman, Arlington, Va.; Helmut T. Weinmann, Munich, Germany

[73] Assignee: The United States of America as represented by the Secretary of the Navy, Washington, D.C.

[22] Filed: Mar. 17, 1967

[21] Appl. No.: 624,677

[52] U.S. Cl. .............................. 340/6 R, 340/16 R
[51] Int. Cl. ............................................. G01s 3/80
[58] Field of Search ........ 340/6, 16; 343/100.6, 113

[56] References Cited
UNITED STATES PATENTS 3,292,177  12/1966  Brightman et al. ................. 343/113
3,356,989  12/1967  Autrey ................................... 340/6

Primary Examiner—Richard A. Farley

[57] ABSTRACT

An omnidirectional hydrophone system having an array of a plurality of hydrophones arranged in radially extending spaced relationship in a plurality of concentric circles. The signals detected by each hydrophone are transmitted to a remote location where the signals are fed to a plurality of channels representing a beam line formed by the hydrophones and are delayed by diverse amounts determined by the physical location of each hydrophone relative to the beam line and simultaneously added to provide an indication of a target location.

5 Claims, 7 Drawing Figures

INVENTORS
ARMAND CIOCCIO
EDWARD C. WHITMAN   JAMES E. COTTRELL, JR.
JIM B. McQUITTY   JOHN D. SHERMAN
HELMUT T. WEINMAN
BY
ATTORNEY
AGENT

Fig. 6 — DELAY TABLE

| HYD. | Beam 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1  | 12 | 12 | 11 | 10 | 8  | 7  | 5  | 4  | 2  | 1  | 0  | 0  | 0  | 0  | 1  | 2  | 4  | 5  | 7  | 8  | 10 | 11 | 12 | 12 |
| 2  | 12 | 12 | 12 | 10 | 8  | 7  | 5  | 4  | 2  | 1  | 0  | 0  | 0  | 0  | 0  | 2  | 4  | 5  | 7  | 8  | 10 | 11 | 12 | 12 |
| 3  | 11 | 12 | 12 | 10 | 8  | 7  | 5  | 4  | 2  | 1  | 0  | 0  | 0  | 0  | 0  | 2  | 4  | 5  | 7  | 8  | 10 | 11 | 12 | 12 |
| 4  | 10 | 12 | 12 | 11 | 8  | 7  | 5  | 4  | 2  | 1  | 0  | 0  | 0  | 0  | 0  | 2  | 4  | 5  | 7  | 8  | 10 | 11 | 12 | 12 |
| 5  | 8  | 10 | 12 | 12 | 11 | 8  | 7  | 5  | 4  | 2  | 1  | 0  | 0  | 0  | 0  | 0  | 2  | 4  | 5  | 7  | 8  | 10 | 11 | 12 |
| 6  | 7  | 8  | 10 | 12 | 12 | 11 | 8  | 7  | 5  | 4  | 2  | 1  | 0  | 0  | 0  | 0  | 0  | 2  | 4  | 5  | 7  | 8  | 10 | 11 |
| 7  | 5  | 7  | 8  | 10 | 12 | 12 | 11 | 8  | 7  | 5  | 4  | 2  | 1  | 0  | 0  | 0  | 0  | 0  | 2  | 4  | 5  | 7  | 8  | 10 |
| 8  | 4  | 5  | 7  | 8  | 10 | 12 | 12 | 11 | 8  | 7  | 5  | 4  | 2  | 1  | 0  | 0  | 0  | 0  | 0  | 2  | 4  | 5  | 7  | 8  |
| 9  | 2  | 4  | 5  | 7  | 8  | 10 | 12 | 12 | 11 | 8  | 7  | 5  | 4  | 2  | 1  | 0  | 0  | 0  | 0  | 0  | 2  | 4  | 5  | 7  |
| 10 | 1  | 2  | 4  | 5  | 7  | 8  | 10 | 12 | 12 | 11 | 8  | 7  | 5  | 4  | 2  | 1  | 0  | 0  | 0  | 0  | 0  | 2  | 4  | 5  |
| 11 | 0  | 1  | 2  | 4  | 5  | 7  | 8  | 10 | 12 | 12 | 11 | 8  | 7  | 5  | 4  | 2  | 1  | 0  | 0  | 0  | 0  | 0  | 2  | 4  |
| 12 | 0  | 0  | 1  | 2  | 4  | 5  | 7  | 8  | 10 | 12 | 12 | 11 | 8  | 7  | 5  | 4  | 2  | 1  | 0  | 0  | 0  | 0  | 0  | 2  |
| 13 | 2  | 3  | 5  | 8  | 9  | 10 | 10 | 9  | 7  | 4  | 3  | 2  | 2  | 3  | 5  | 8  | 9  | 10 | 10 | 9  | 7  | 4  | 3  | 2  |
| 14 | 3  | 2  | 3  | 5  | 8  | 9  | 10 | 10 | 9  | 7  | 4  | 3  | 2  | 2  | 3  | 5  | 8  | 9  | 10 | 10 | 9  | 7  | 4  | 3  |
| 15 | 2  | 2  | 2  | 3  | 4  | 5  | 5  | 5  | 5  | 4  | 3  | 4  | 5  | 5  | 5  | 4  | 3  | 2  | 2  | 3  | 4  | 4  | 4  | 4  |
| 16 | 2  | 3  | 5  | 7  | 8  | 8  | 8  | 7  | 5  | 4  | 3  | 2  | 2  | 3  | 5  | 7  | 8  | 8  | 8  | 7  | 5  | 4  | 3  | 2  |
| 17 | 3  | 4  | 5  | 7  | 8  | 10 | 10 | 9  | 7  | 5  | 3  | 2  | 3  | 4  | 6  | 8  | 9  | 10 | 10 | 9  | 7  | 5  | 4  | 3  |
| 18 | 5  | 7  | 8  | 10 | 10 | 9  | 7  | 5  | 3  | 2  | 3  | 5  | 8  | 9  | 10 | 10 | 9  | 7  | 5  | 4  | 5  | 7  | 8  | 9  |
| 19 | 8  | 9  | 10 | 10 | 9  | 9  | 9  | 9  | 9  | 8  | 7  | 6  | 6  | 7  | 8  | 9  | 9  | 9  | 9  | 9  | 10 | 10 | 9  | 9  |
| 20 | 9  | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 |
| 21 | 10 | 10 | 9  | 8  | 7  | 6  | 5  | 4  | 4  | 4  | 5  | 6  | 7  | 8  | 9  | 10 | 10 | 10 | 10 | 10 | 10 | 10 | 10 | 10 |
| 22 | 9  | 9  | 7  | 5  | 4  | 3  | 3  | 4  | 5  | 7  | 9  | 10 | 10 | 9  | 7  | 5  | 4  | 3  | 3  | 4  | 5  | 7  | 9  | 10 |
| 23 | 7  | 5  | 4  | 3  | 3  | 4  | 5  | 7  | 9  | 10 | 10 | 9  | 7  | 5  | 4  | 3  | 3  | 4  | 5  | 7  | 9  | 10 | 10 | 9  |
| 24 | 5  | 4  | 3  | 4  | 5  | 7  | 9  | 10 | 10 | 9  | 7  | 5  | 4  | 3  | 4  | 5  | 7  | 9  | 10 | 10 | 9  | 7  | 5  | 4  |
| 25 | 8  | 8  | 8  | 7  | 7  | 6  | 6  | 5  | 5  | 4  | 4  | 4  | 4  | 4  | 4  | 5  | 5  | 6  | 6  | 7  | 7  | 8  | 8  | 8  |
| 26 | 7  | 8  | 8  | 8  | 8  | 8  | 8  | 7  | 7  | 6  | 6  | 5  | 5  | 6  | 6  | 7  | 7  | 8  | 8  | 8  | 8  | 8  | 8  | 7  |
| 27 | 5  | 6  | 6  | 7  | 7  | 8  | 8  | 8  | 8  | 8  | 8  | 7  | 7  | 6  | 6  | 5  | 5  | 6  | 6  | 7  | 7  | 8  | 8  | 8  |
| 28 | 4  | 4  | 4  | 5  | 5  | 6  | 6  | 7  | 7  | 8  | 8  | 8  | 8  | 8  | 8  | 7  | 7  | 6  | 6  | 5  | 5  | 4  | 4  | 4  |
| 29 | 5  | 4  | 4  | 4  | 4  | 4  | 4  | 5  | 5  | 6  | 6  | 7  | 7  | 6  | 6  | 5  | 5  | 4  | 4  | 4  | 4  | 4  | 4  | 5  |
| 30 | 7  | 6  | 6  | 5  | 5  | 4  | 4  | 4  | 4  | 4  | 4  | 5  | 5  | 6  | 6  | 7  | 7  | 8  | 8  | 7  | 7  | 6  | 6  | 7  |

Fig. 6

INVENTORS
ARMAND CIOCCIO  EDWARD C. WHITMAN
JAMES E. COTTRELL, JR.  JIM B. McQUITTY
JOHN D. SHERMAN  HELMUT T. WEINMAN

REMOTELY FORMED MULTIBEAM HYDROPHONE SYSTEM

The invention described herein may be manufactured and used by or for the Government of the United States of America for governmental purposes without the payment of any royalties thereon or therefor.

This invention relates to underwater signal systems and more particularly to omnidirectional hydrophone systems for detecting acoustical signals at great depths in the ocean.

Sonar systems which operate over near-surface acoustic paths are strongly dependant upon the variable thermal conditions which occur near the surface of the ocean as well as upon the underwater tactics of a submarine target. To achieve reliable long range detection, it has been found necessary to utilize acoustic paths in the ocean which run deeper than the near-surface regions. In most areas of the world, the ocean may be divided vertically into three regions. The first region wherein most present day sonar systems operate is a relatively warm region near the surface where propagation conditions are variable. The second region is a negative velocity gradient region extending down the axis of the deep sound channel at a depth of 2,000 to 4,000 feet, where the temperature drops rapidly with depth causing the sound rays to be refracted downward. The third region is a positive velocity gradient region below the sound channel axis where the effect of increasing pressure causes sound rays to be refracted upward. The speed of sound, therefore, decreases with depth down to the sound channel axis, and then increases again at greater depths.

A path which is not constrained to the unfavorable near-surface regions and which has the advantage of solid coverage of the sea surface out to long ranges is the Reliable Acoustic Path, hereinafter referred to as RAP. The RAP makes use of the acoustic properties of the deep ocean and is usually found at a depth 8,000 to 15,000 feet for surface temperatures of 60° to 80° F. A transducer lowered into the RAP will find its optimum performance at the depth at which the speed of sound is equal to its maximum near-surface value. Any rays from the sound source at this depth, excepting those which are intercepted by the bottom, will be refracted to the surface. Almost solid coverage of the surface may be provided out to ranges on the order of 15 to 20 miles. Of course, where the water depth is considerable greater than the optimum depth, even greater surface coverage is obtained from rays which leave the source in a downward direction and are refracted to the surface.

In the past, hydrophone systems employing the RAP have placed on explosive sound source and a hydrophone at depths near 12,000 feet for detecting near-surface targets which were in the direct sound field of the source. These systems, although satisfactory in some instances, meet with severe difficulties when reverberatim echoes return from surface or near-surface scatterers at the same time as the target echo or when the sea bottom or surface causes a reverberation background along near-vertical paths. These systems are also limited in that they had no way of forming beams at a remote station or simultaneously developing a plurality of beaming channels.

The hydrophone system of the present invention is a deep water multibeam searching system which discriminates against background reverberation and is intended for use in the sonobuoy system described in the Application Ser. No. 545,209 of Albert S. Will et al. filed Apr. 19, 1966. The overall sonobuoy system was developed to improve detecting capability in range and bearing over a large detection area using a single sonobuoy having an umbrella hydrophone array which is paid out by a long coaxial cable to a deep depth. When the hydrophone array is in detection position, line explosive charges which have also been released into the water in the vicinity of the sonobuoy are fired by aircraft radio signals at a depth near that of the hydrophone array. The hydrophone array detects reflected pulses from any direction and provides a 360° discrimination directional pattern by means of a plurality of parallel electronically scanned beam-formed detection channels. Parallel data from individual stationary hydrophones are converted into a serial data stream and travel up the coaxial cable to a radio transmitter floating near the surface of the water which in turn transmits the data signals to a remote receiving station which may be located in a nearby aircraft or other suitable detection position.

Accordingly, an object of the invention is to provide a new and improved hydrophone system for use in deep water.

Another object of the invention is the provision of a new and improved multibeam system which discriminates target echoes from background reverberations.

Yet another object of the invention is to provide multibeam forming system for a plurality of stationary hydrophones.

Still another object of the invention is to provide a system for forming a multibeam search plane for a hydrophone array at a remote station.

Another object of the invention is to provide a method of remotely scanning a multibeam search plane for a hydrophone array.

A further object is the provision of a multibeam hydrophone system for utilizing the Reliable Acoustic Path in the ocean.

Also an object of the invention is to provide a system which simultaneously developes a plurality of beams for a hydrophone array.

Also another object is the provision of a new method of passively listening to target noise against a background of isotropic sea noise.

Also still another object is to provide a new and improved hydrophone system which utilizes explosive sound sources for echo ranging.

These and other objects are attained in accordance with the invention by providing a remotely located multibeam forming system in combination with a deep water hydrophone array which together perform a complementary space time operation upon incoming signals. The array includes a plurality of equally spaced horizontal arms each having a plurality of vertical staves with a hydrophone output for each stave. The beam former comprises a shift register for each stave output and a plurality of signal processing circuits having inputs from predetermined delay stages of the shift registers.

Other objects, features, and attendant advantages of this invention will be readily appreciated as the same becomes better understood by reference to the accompaning drawings wherein:

FIG. 6 is a delay table for one embodiment of the invention.

Figure 1:
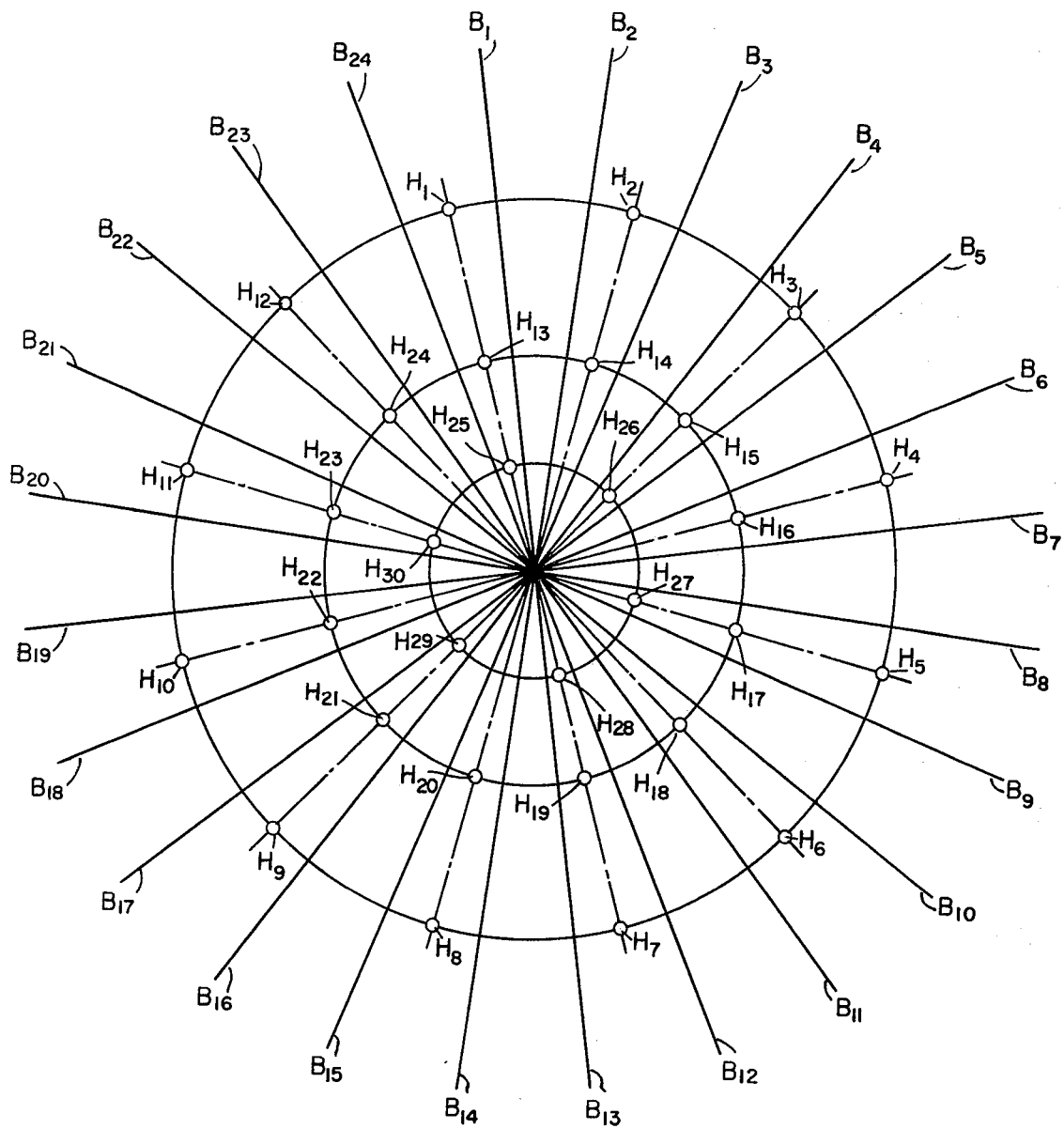
FIG. 1 illustrates the position of the hydrophones and the beaming areas of one embodiment of the invention.
Figure 4:
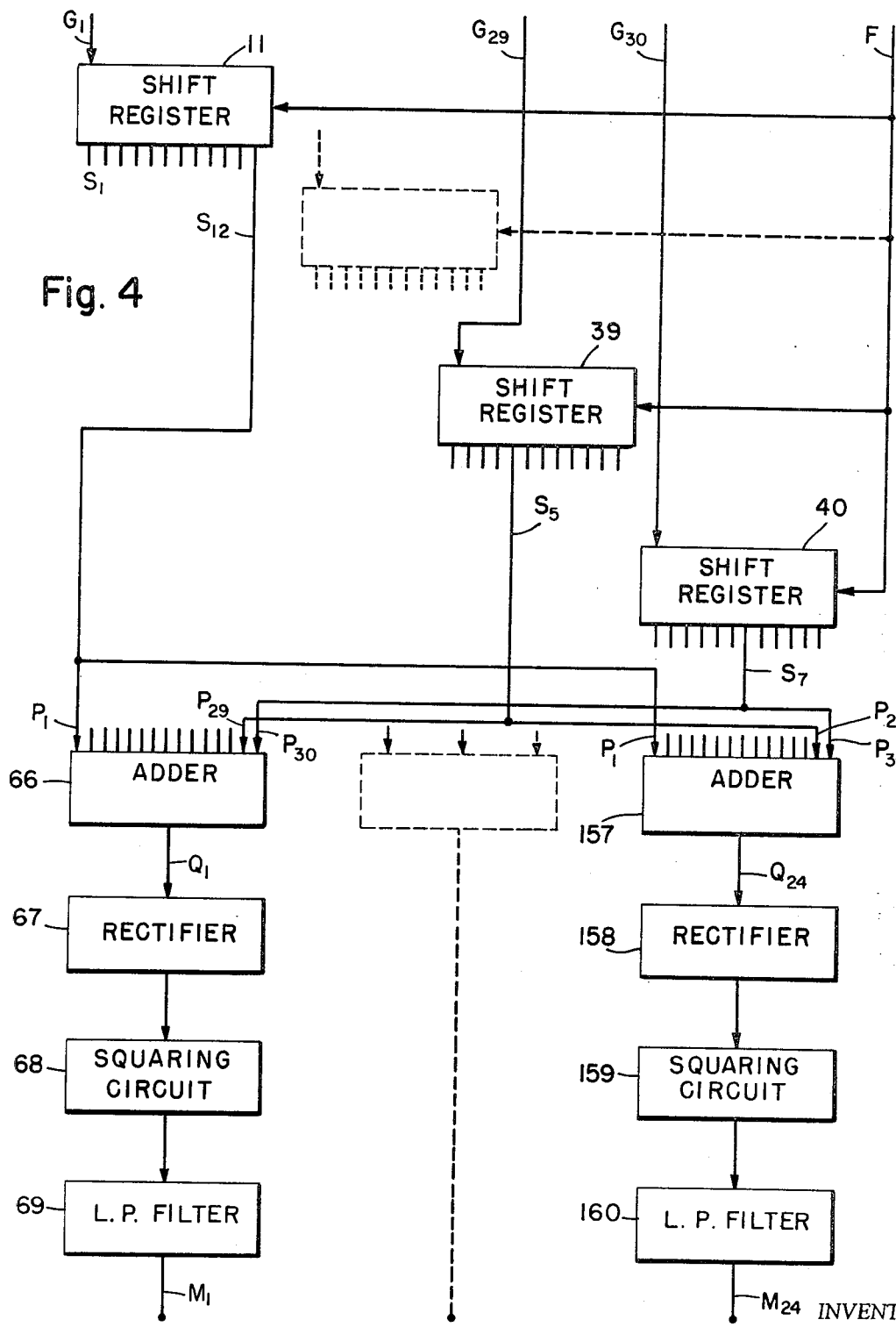
FIG. 4 is a block diagram of the remote beam former of the invention.

One embodiment of the invention is shown generally in FIGS. 1 considered with FIGS. 4 and 6. FIG. 1 shows the positioning of thirty hydrophones arranged in three concentric circles and twenty-four beaming paths for reflected signals received at the hydrophone array. The array, which is more fully described in the A. S. Will et al. application above, provides a directional pattern for maximum discrimination against boundary reverberation. Twelve equally spaced horizontal arms along the axes passing through hydrophone staves $H_1$ to $H_{12}$ and the center of the array have alternately two or three vertical staves with at least one hydrophone per stave. A total of thirty stationary hydrophone staves $H_1$ to $H_{30}$ form an array which is electrically scanned simultaneously in all directions in the plane of search. Horizontal angular steering is provided to compensate for the time difference of signal arrival occurring over the array by delay line circuits in the remote beam former which will be described more fully hereinafter with regard to FIG. 4. Twenty-four beams ($B_1$ to $B_{24}$) are formed simultaneously in the remote station and signals from each beam are submitted to combination detection circuits for measuring signal times and bearing.

Figure 2A:
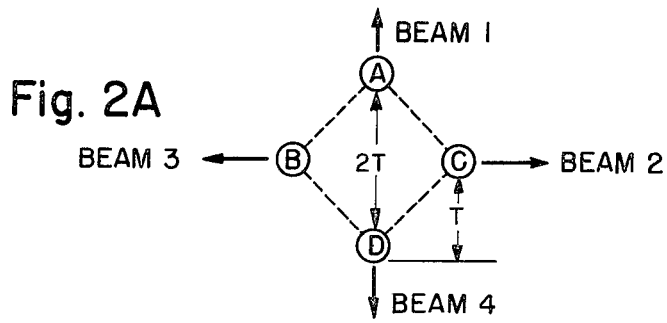
FIG. 2A and 2B illustrates a method of the invention for beam forming in a four-element hydrophone array.
Figure 2B:
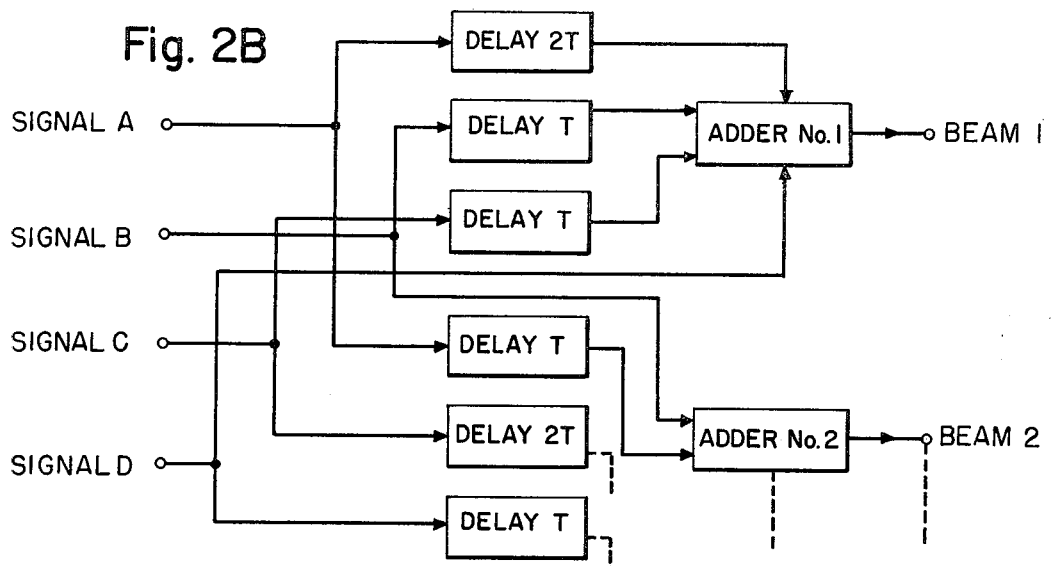

FIG. 2A and 2B illustrate the basic method used in beam forming for the multibeam hydrophone system of the invention. Considering first the four elements A, B, C and D with beams 1, 2, 3 and 4 passing through them in the direction indicated in FIG. 2A, it can be seen that the block diagram of FIG. 2B may be formed. The time T is equal to half the sound travel time across the diagonal of the square whose corners contain the elements, so that if the signals from element A are delayed 2T seconds, and those from B and C are delayed T seconds, and that from D has no delay, then the noise which adder No. 1 receives from all elements in the direction of Beam 1 will be correlated. The output from adder 1 is most sensitive to excitation along line AD as is the output from an adder for Beam 4. In a similar manner, Beams 2, 3 and 4 may be formed for the most sensitive directions of elements C, B, and D with each beam requiring a separate arrangement of delays.

The hydrophone array shown in FIG. 1 has a total of 30 independant elements $H_1 - H_{30}$ with elements $H_1$ to $H_{12}$ equally spaced on a diameter of 3 $\lambda_o$, where $\lambda_o$ is the wave length of the center frequency. Hydrophones $H_{13}$ to $H_{24}$ are equally spaced on a diameter of 2 $\lambda_o$ and hydrophones $H_{25}$ to $H_{30}$ are equally spaced on a diameter of $\lambda_o$. When the array is deployed horizontally, the elements are all mounted on 12 radial arms separated 30°. Twenty-four horizontal beams are formed simultaneously having 15° of azimuth angle covered by each beam and each beam formed by introducing appropriate delays in the output of each hydrophone element which project all the elements to a straight line.

The output of each hydrophone element is passed first through a band pass filter then amplified and clipped. The clipped signals are sampled at a frequency that satisfies the Shannon sampling theorem for clipped signals before being multiplexed and sent up a cable to a transmitter where they are transmitted to a remote station containing the beam forming computer. The patent application Ching et al., Ser. No. 565,499 filed July 15, 1966, now U.S. Pat. No. 3,484,555, discloses the multiplexing system in more detail. The computer at the remote station inserts the appropriate delays to the received signals, sums and then time averages them to form each beam. The outputs of all the beams are then displayed on a range and bearing recorder (not shown).

In the embodiment shown in FIG. 1, the symmetry of the array provides twenty-four equally spaced beams which are formed using a minimum set of delays. Except for hydrophones $H_{25}$ to $H_{30}$ the array configuration around the even numbered beam axes is the mirror image of the array configuration around the odd numbered beam axes. In general, good beam forming is produced if incremental delays are selected such that the mean of the delay errors is zero; that is, if the following equation holds for each beam:

$$\sum_{i=1}^{N} (d_i - n_i c \Delta \tau) = 0 \quad (1)$$

where $d_i$ = algebraic displacement of the $i$th hydrophone from a plane that is normal to the beam axis and through one of the undelayed hydrophones.

$n_i$ = positive integer (including 0).

$c$ = speed of sound in water at the array $\Delta \tau$ = increment of time delay that must be used to satisfy the equation.

$N$ = number of hydrophones in the array.

For the array in FIG. 1, a value of $\Delta \tau$ is found which satisfies equation (1) for each of the beams, provided the maximum value of $n_i$ is an even integer. For example, if $d_i = x_i + m/2 \; c \; \Delta \tau$ (2)

where $m/2$ is an integer and $m$ is the value of the largest $n_i$, and $x_i$ is algebraic displacement of the $i$th hydrophone from a plane that is normal to the beam axis and through the center of the array, and equation (2) is substituted in equation (1), the following equation results:

$$\sum_{i=1}^{N} (x_i + k_i c \Delta \tau) = 0 \quad (3)$$

where $k_i = m/2 - n_i$ for an integer varying from $-m/2$ to $m/2$.

The displacement of any hydrophone from any side of any plane through the center of the array is equal and opposite to the displacement of a hydrophone from the other side of the plane. The displacement error can be minimized when $$\sum_{i=1}^{N/2} (x_i + k_i c \Delta \tau) = \min \quad (4)$$

Equation (4) has been minimized to nearly zero for 10 increments of delay and 12 increments of delay.

The degradation of array gain due to incremental delays is calculated from the following equation:

$$2/n \sum_{i=1}^{N/2} \cos\left[\frac{2\pi}{\lambda_0}(x_i + k_i c \Delta \tau)\right] \quad (5)$$

For the embodiment disclosed, an optimum sampling frequency $F_s$ equal to $1/\Delta\tau$ has been found to be around 12.1 KC.

Figure 3:
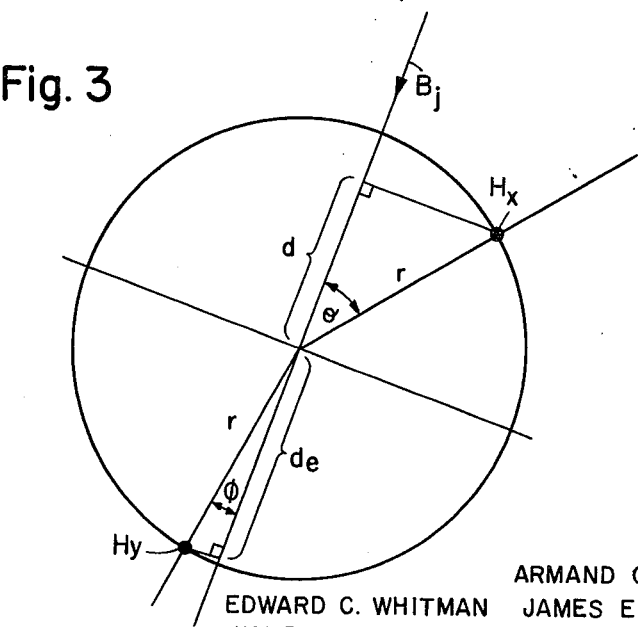
FIG. 3 is a geometrical relationship between hydrophones and beams as used in determining time delays of the invention.

Once having choosen $\Delta\tau$ and the number of shift register stages, the geometry of the array determines the number of delay units (shift register taps) required for each hydrophone signal and a given beam. FIG. 6 shows the shift register taps in the remote station which correspond to the hydrophones and beams of FIG. 1. These numbers are selected as shown in FIG. 3, so that the last hydrophone $H_y$ reached by a plane wave for a beam direction $B_j$ receives no delay. The exact delay needed to compensate any other hydrophone $H_x$ with respect to the last $H_y$ is given by: $t_e = d + d_e/c = r (\cos \theta + \cos \phi)/c$ (6)

$t_e$ is approximated by an integral multiple of $\Delta\tau$; $t_e \approx K \Delta\tau$, where K is an integer, giving the shift register stage from which the particular hydrophone signal must be drawn for a given beam. For the array of FIG. 1, the signal from the last hydrophone reached by the wave is tapped from the input to its shift register, whereas the signal from the the first hydrophone touched is taken at the output of its shift register. Signals from hydrophones in the interior of the array are tapped at predetermined intermediate points of corresponding registers.

Referring now to FIGS. 4 and 6, the remote beam former for the hydrophone array of FIG. 1 can be more clearly understood. The beam former has 30 shift registers, 11 through 40, with 12 stages each and an input G from a corresponding hydrophone. For example, $G_1$ is a demultiplexed signal input corresponding to hydrophone element $H_1$, input $G_{29}$ corresponds to element $H_{29}$, $G_{30}$ corresponds to element $H_{30}$, etc. A clock signal is supplied over leads F to each of the shift registers with a clock pulse equal to the delay time of each stage, $\Delta\tau$, and the registers are driven at a clock rate equal to the sampling pulse rate. The successive stages of a register contain polarity information sampled from a hydrophone at instances separated in time by the amount $\Delta\tau$. If the input to the first register stage contains a bit corresponding to the output of a particular hydrophone at time $t = 0$, the $k^{th}$ register stage contains a bit corresponding to the situation $k \Delta\tau$ earlier. Output leads $S_1$ to $S_{12}$ of each shift register correspond, therefore, to delay taps which are separated by incremental delay units equal to $\Delta\tau$.

Twenty-four adder circuits each having thirty input taps $P_1 - P_{30}$ connect to corresponding shift registers 11 through 40 respectively. Adders 66 and 157 for example, have inputs from delay tap lead $S_{12}$ of shift register 11, lead $S_5$ of shift register 39, and lead $S_7$ of shift register 40. The remaining 27 inputs may be found in FIG. 6 under Beam Nos. 1 and 24.

After the signals from each hydrophone are added in adder 66, an output signal on lead $Q_1$ passes to rectifier 67, is squared by the square law circuit 68 and is filtered by low pass filter 69 before finally appearing as a range and bearing signal in Beam 1. Similarly adder 157, rectifier 158, squaring circuit 159, and filter 160 process hydrophone signals for Beam 24. Adding, rectifying, squaring, and filtering are also provided for each of the other beams 2 – 23.

Figure 5:
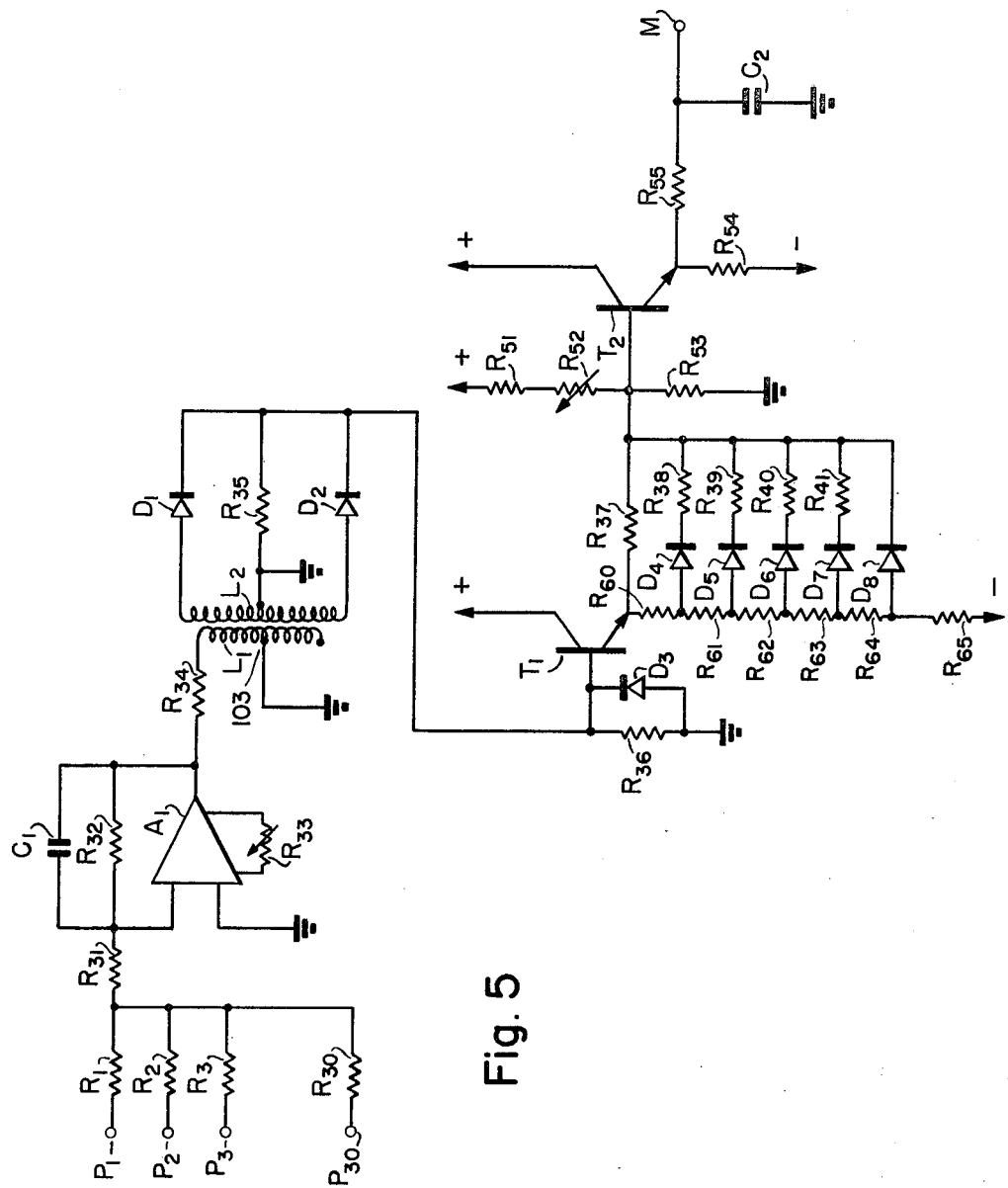
FIG. 5 is a circuit diagram of a signal processing circuit for a beam channel of the invention.

An adder and signal processing circuitry for one of the beam channels at the remote station is shown in detail in FIG. 5. Input voltages from each of the shift registers appear across resistors $R_1 - R_{30}$ and are added to the voltage across resistor $R_{31}$ connected to the input of amplifier $A_1$. Amplifier $A_1$ has a feedback net work consiting of capacitor $C_1$ and resistor $R_{32}$ which provides the summing action. Capacitor $C_1$ is very small and is used to suppress any stray high frequency that may be present.

The output voltage of the summing amplifier appears across resistor $R_{34}$ and winding $L_1$ of transformer 103. Voltages impressed on winding $L_2$ are then full wave rectified by diodes $D_1$ and $D_2$ which have resistor $R_{35}$ connecting their cathodes to ground. Winding $L_1$ and $L_2$ are also connected to ground by center taps on the windings. The rectifier output voltage is impressed on resistor $R_{36}$ connected between the base of emitter follower transistor $T_1$ and ground. A diode $D_3$ is also connected between the base of transistor $T_1$ and ground and serves to prevent the base of $T_1$ from going negative. The emitter output of transistor $T_1$ is passed through a square law circuit which is connected to the base of a second emitter follower transistor $T_2$ and a voltage divider comprising resistors $R_{51}$, $R_{52}$ and $R_{53}$.

The square law circuit is a resistor-diode network which is biased to provide a square law output for linear voltage inputs. Transistor T has its collector connected to positive battery and its emitter output terminal connected to a plurality of resistor-diode networks. Resistors $R_{60} - R_{64}$ are low resistant compared to resistor $R_{65}$ which is a large resistor connected to negative battery. Normally in operation the emitter output of transistor $T_1$ is supplied across resistor $R_{37}$ with resistors $R_{60} - R_{64}$ acting as small incremental current sources. As the base voltage to transistor $T_1$ increases the emitter output voltage increases and overcomes one by one the foreward bias on diodes $D_4$ to $D_8$ bringing the resistors $R_{38} - R_{41}$ into the output circuit and incrementally adding their currents in resistor $R_{37}$. In this manner a squared output signal is obtained from the rectified input to transistor $T_1$.

The square law network is directly connected to voltage divider resistors $R_{51}$, $R_{52}$ and $R_{53}$ and also to the base of a second emitter follower transistor $T_2$. The emitter terminal of $T_2$ is connected to ground through a low pass filter circuit comprising resistor $R_{55}$ and capacitor $C_2$. The low pass filter acts as a time average or integrator thus providing a beam output at terminal M with suppressed higher frequency fluctuations and having a signal to noise ratio which is directly proportional to the averaging time for steady state signals. Any change, in the average output of the squarer, therefore, in a beam output indicates that a target is in the area assigned for the beam.

It should now be apparent to one skilled in the art that a remotely formed multibeam hydrophone system has been developed which provides solid coverage of a sea surface out to very great ranges and which has very high target discrimination capabilities against background reverberation. Although one specific embodiment of the invention has been described in detail, the invention is not so limited as many other embodiments and modifications are contemplated and fall within the scope of the invention. The described embodiment, for example, uses 24 beaming channels although more or less beaming channels could be used. Also the particular processing circuitry and square law device may be modified without departing from the scope of the invention. Numerous other modifications or alterations may be made therein which are encompassed by the spirit and scope of the invention as set forth in the appended claims.

We claim:

1. A method of remotely forming a multibeam omnidirectional hydrophone system comprising the steps of:

arranging a plurality of hydrophones in predetermined concentric circles about the midpoint of a hydrophone array, deploying said hydrophones to a detecting position in a deep water environment, selecting a predetermined number of beaming channels at a remote station for processing signals detected by said hydrophones, each of said channels representing a beam line extending from the center of the hydrophone array to the surface of the ocean, transmitting hydrophone output signals from each of said hydrophones to said remote station upon the occurrence of a detection event, channeling all of said hydrophone outputs in to each of said beam channels, delaying each of said hydrophone signals received at said remote station in each channel by an amount determined by the physical location of each of said hydrophones with respect to the geometrical orientation of the beam line, and simultaneously adding said delayed signals in each beam channel.

2. A multibeam omnidirectional hydrophone system comprising, a hydrophone array in a deep water environment having a plurality of hydrophones and a plurality of radially extending arms, said hydrophones attached to said arms in a predetermined pattern forming three concentric detection circles about the center of said array, means for transmitting output signals from each of said hydrophones to a remote location, means for receiving said signals at said remote location, a plurality of beam channels at said remote location, a plurality of shift registers each having a plurality of delay stages, each shift register having an individual information input channel and common clock channel inputs, a plurality of output leads connected one to each of the delay stages of each of said registers, means connecting output leads from predetermined delay stages of each of said shift registers to each of said plurality of beam channels, and adding means in each channel combining delayed signals from said shift registers simultaneously.

3. The system of claim 2 further comprising in each beam channel a full wave rectifier coupled to said adding means, a squaring circuit, and an integrating circuit having an output lead, said squaring circuit coupled between said rectifier and integrating circuit.

4. The system of claim 2 wherein there are at least thirty hydrophone outputs, six of said hydrophones spaced equidistant on a line defining the circumferences of the circle nearest the center of the array, and twelve of said hydrophones spaced equidistant on each of the second and third circles, and there are at least twenty four beam channels each representing a beam line passing through the center of said array displaced a predetermined number of degrees from each of said radially extending arms.

5. A hydrophone system having a remotely formed beam channel comprising a hydrophone array in a deep water environment having a plurality of hydrophones and a plurality of radially extending arms, said hydrophones attached to said arms in a predetermined pattern forming three concentric detection circles about the center of said array, means for transmitting output signals from each of said hydrophones to a remote location, means for receiving said signals at said remote location, a plurality of beam channels at said remote location, a plurality of shift registers each having a plurality of delay stages, each shift register having an individual information input channel and common clock channel inputs, a plurality of output leads connected one to each of the delay stages of each of said registers, means connecting output leads from predetermined delay stages of each of said shift registers to each of said plurality of beam channels, and a beam channel located at a remote station representing a reflected beam path, a plurality of delay means one for each of said hydrophone outputs, each of said delay means having an individual input channel and an output channel, each of said output channels connected to said beam channel, said beam channel having means for simultaneously adding the delayed signal outputs to provide an indication of a target in the vicinity of said beam.

* * * * *